United States Patent
Judd

(10) Patent No.: US 7,844,643 B2
(45) Date of Patent: Nov. 30, 2010

(54) STORAGE MANAGEMENT SYSTEM WITH INTEGRATED CONTINUOUS DATA PROTECTION AND REMOTE COPY

(75) Inventor: Ian David Judd, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 11/836,068

(22) Filed: Aug. 8, 2007

(65) Prior Publication Data

US 2008/0040402 A1   Feb. 14, 2008

(30) Foreign Application Priority Data

Aug. 9, 2006   (GB) .................................. 0615779.6

(51) Int. Cl.
*G06F 17/00* (2006.01)
(52) U.S. Cl. ...................... 707/813; 707/707; 707/708; 707/814
(58) Field of Classification Search ................. 707/120, 707/203, 204
See application file for complete search history.

(56) References Cited

U.S. PATENT DOCUMENTS

| | | | | |
|---|---|---|---|---|
| 6,353,878 | B1 * | 3/2002 | Dunham | 711/162 |
| 7,389,300 | B1 * | 6/2008 | Shah et al. | 707/101 |
| 2005/0251540 | A1 | 11/2005 | Sim-Tang | |
| 2007/0011213 | A1 * | 1/2007 | Burton et al. | 707/204 |

* cited by examiner

*Primary Examiner*—Sana Al-Hashemi
(74) *Attorney, Agent, or Firm*—David W. Victor; Konrad Raynes and Victor LLP

(57) ABSTRACT

A storage control system is adapted to operate as a primary of a remote copy pair by communicating with a secondary of the remote copy pair, and comprises: an I/O receiving component for receiving read and write commands; a continuous data protection component operatively coupled to the I/O receiving component for maintaining a continuous data protection journal; the continuous data protection journal operable to retain write I/O data items for access by subsequent read commands and to roll back the data at the primary of the remote copy pair; a remote copy controller component adapted to read the write I/O data item from the continuous data protection journal; and a remote copy transmission component operatively coupled to the remote copy controller component to transmit the write I/O data item to the secondary of the remote copy pair.

21 Claims, 3 Drawing Sheets

US 7,844,643 B2

STORAGE MANAGEMENT SYSTEM WITH INTEGRATED CONTINUOUS DATA PROTECTION AND REMOTE COPY

CROSS-REFERENCE TO RELATED APPLICATIONS

This applications claims priority benefits under Title 35, United States Code, Section 119(a)-(d) or Section 365(b) of United Kingdom Patent Application No. GB0615779.6, filed on Aug. 9, 2006, by Ian David Judd, and entitled "STORAGE MANAGEMENT SYSTEM WITH INTEGRATED CONTINUOUS DATA PROTECTION AND REMOTE COPY", which application is incorporated herein by reference in its entirety.

FIELD OF THE INVENTION

The present invention relates to technology for data storage management, and in particular to a technology for maintaining continuous data protection integrated with a remote copy facility, using commonly-available components and with minimal additional resource use.

BACKGROUND

Continuous Data Protection (CDP) allows a customer to roll back data to a previous point in time with fine granularity. This is superior to previous discrete data replication solutions because the recovery point can be fine-tuned to minimize data loss. CDP solutions are already available for block storage, files and databases. Although file systems and databases are the main users of block storage, a block CDP solution is also useful in any storage technology because it can recover all of the data storage in a data centre to a consistent state.

Critical data is often protected against disasters by mirroring it to another site. The remote copy can be updated synchronously with each write command issued by the application or asynchronously at a later time, according to the distance between sites.

Published US Patent Application No. US 2005/0251540, assigned to Atempra Technologies Inc., describes a data management system for data protection and disaster recovery. Disclosed therein is a special device driver in each host which captures data modifications and application-level events and saves them to a journal to ensure that data replicas have application-level consistency. The journal sits alongside the primary storage for the application, so there are two copies of the data on the primary site.

There remain the problems of inefficiencies of resource use in the need to provide special nonstandard device drivers in each host and in the need to provide duplicate storage facilities for storing the additional journal data.

It would thus be desirable to have a technological means for maintaining continuous data protection integrated with a remote copy facility, using commonly-available components and with minimal additional resource use.

SUMMARY

In one embodiment, a storage control system adapted to operate as a primary of a remote copy pair by communicating with a secondary of said remote copy pair, comprising: an I/O receiving component for receiving read and write commands; a continuous data protection component operatively coupled to said I/O receiving component for maintaining a continuous data protection journal; said continuous data protection journal operable to retain write I/O data items for access by subsequent read commands and to roll back the data at said primary of said remote copy pair; a remote copy controller component adapted to read said write I/O data item from said continuous data protection journal; and a remote copy transmission component operatively coupled to said remote copy controller component to transmit said write I/O data item to said secondary of said remote copy pair.

The storage control system may further be adapted to operate with a secondary of said remote copy pairs wherein said secondary of said remote copy pair comprises a continuous data protection journal to maintain a single copy of each write I/O data item for use in remote recovery.

Further, said write I/O data item may comprise data in compressed form.

The storage control system may further comprises a compression component to convert said write I/O data item to said compressed form.

The storage control system may further comprise a decompression component to convert said write I/O item data in said compressed form to a decompressed form.

The remote copy components may operate in synchronous mode.

In a further embodiment, said remote copy components may operate in asynchronous mode.

Another embodiment provides a method or logic arrangement for operating a primary of a remote copy pair by communicating with a secondary of said remote copy pair, comprising the steps of: receiving read and write commands by an I/O receiving component; maintaining a continuous data protection journal by a continuous data protection component operatively coupled to said I/O receiving component; operating the continuous data protection journal to retain write I/O data items for access by subsequent read commands and to roll back the data at said primary of said remote copy pair; reading, by a remote copy controller component, said write I/O data item from said continuous data protection journal; and transmitting, by a remote copy transmission component operatively coupled to said remote copy controller component, said write I/O data item to said secondary of said remote copy pair.

The secondary of said remote copy pair may comprise a continuous data protection journal to maintain a single copy of each write I/O data item for use in remote recovery.

The write I/O data item may be compressed.

The method may further convert said write I/O data item to said compressed form.

The method may further convert said write I/O item data in said compressed form to a decompressed form.

The remote copy operations may operate in synchronous mode.

Alternatively, said remote copy components may operate in asynchronous mode.

In another embodiment, a data carrier may having functional data, said functional data comprising functional computer data structures to, when loaded into a computer system and operated upon thereby, enable said computer system to perform all the steps of a method according to the second aspect.

In another embodiment, a computer program comprising computer program code may, when loaded into a computer system and executed thereon, cause said computer system to perform all the steps of a method according to the second aspect.

Certain embodiments provide a technical framework for data storage management, and in particular, a technology for maintaining continuous data protection integrated with a remote copy facility, using commonly-available components and with minimal additional resource use.

Further, with certain embodiments, all data may be written into a journal and nowhere else. This means that in such embodiments there is only one copy of the data on each site and all volumes are automatically space-efficient. In conjunction with a directory, the journal may provide the primary storage for the application and a history log for continuous data protection. It may also acts as a buffer to ride through overload or intermittent failure of the link for asynchronous remote copy.

Embodiments of continuous data protection (CDP) that store all data in a Journal may avoid the overhead of copying the previous data to a different location when it is updated, and thus there is no performance penalty for 'copy on write'. Furthermore, using the same Journal as a buffer for asynchronous remote copy may avoid the need for additional intermediate copies.

Certain embodiments provide a CDP scheme which may be tightly integrated with remote copy. This arrangement may minimize performance and storage overheads by keeping only two copies of the data, one at each site. All data at either site may be substantially instantaneously rolled back to a previous point in time.

Certain CDP implementations may make efficient use of storage space in order to maximize the period over which data can be rolled back. Certain of the embodiments may support data compression, both on disk and on the remote link. Further, with certain embodiments, all volumes may be controlled in a space-efficient manner, such that storage is only consumed when a logical block is written for the first time.

BRIEF DESCRIPTION OF THE DRAWINGS

Embodiments will now be described, by way of example only, with reference to the accompanying drawing figures, in which.

DETAILED DESCRIPTION

Certain described embodiments are broadly directed to a CDP scheme which is tightly integrated with remote copy. This may be achieved as described below, with reference to the figures.

Figure 1:
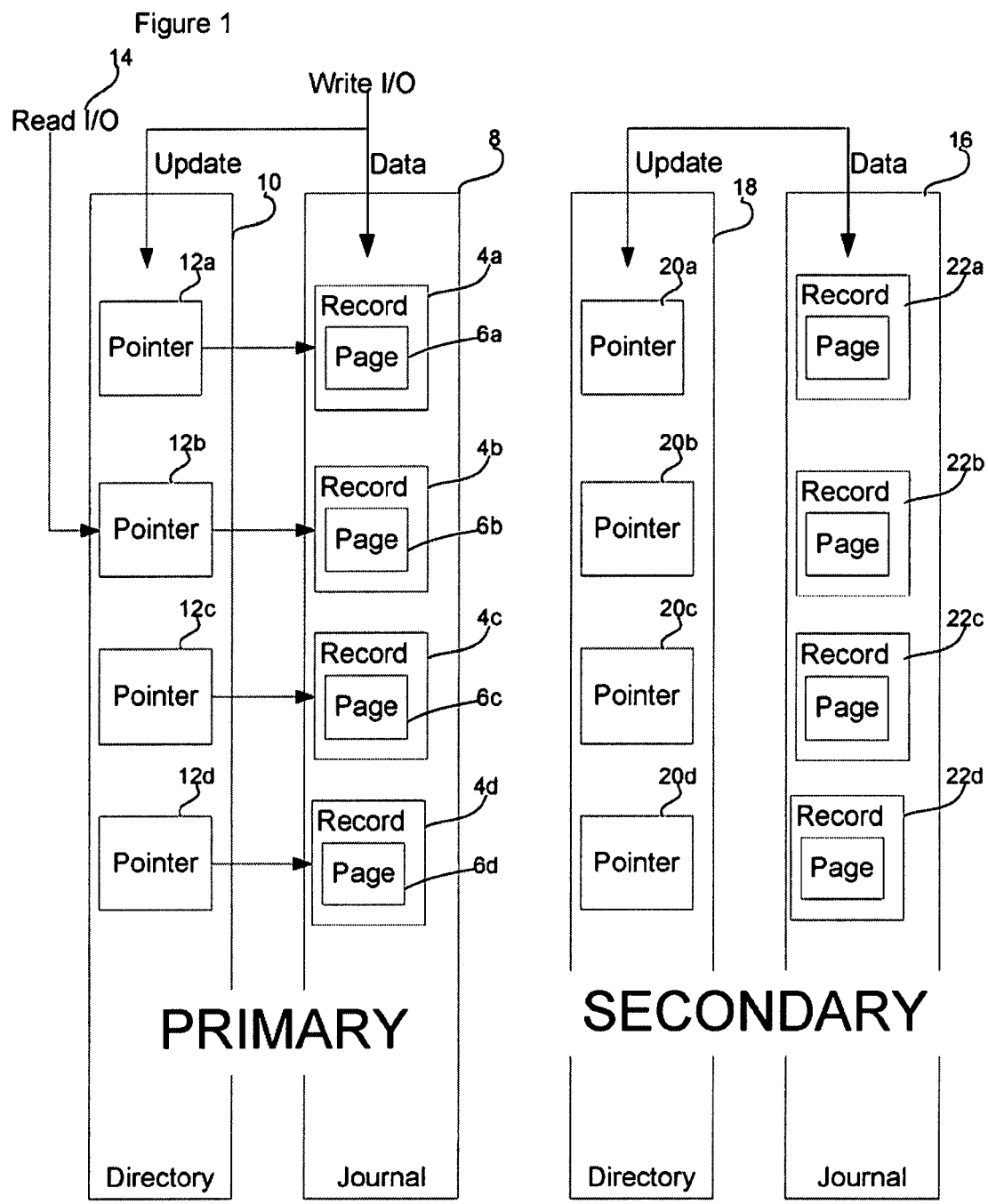
FIG. 1 shows in schematic form an arrangement of data structures.

With respect to FIG. 1, the storage controller divides each logical volume into pages, for example, 4 KB each (which could represent eight 512-byte blocks.) Many applications generate I/O requests of this size, or a multiple thereof. When an application issues a write command 2, the controller appends a Record 4a, 4b, 4c, 4d containing the Page 6a, 6b, 6c, 6d to a sequential Journal 8 which is stored on one or more disk arrays. A single Journal 8 is used to store the writes to all logical volumes managed by a controller. Thus the Journal 8 automatically preserves all previous versions of each Page 6a, 6b, 6c, 6d, in sequence, so that they are available for a subsequent rollback. In one embodiment, updates to the Journal 8 may be accumulated in an underlying non-volatile write cache and destaged to RAID-5 arrays as full Strides in order to minimize the number of disk accesses. In a further embodiment, as the Journal 8 is always written sequentially, the contents of a Record 4a, 4b, 4c, 4d may readily be compressed to save storage space.

The controller also maintains a Directory 10 for each logical volume so that it can locate the contents of a Page in the Journal when it receives a read command. The Directory 10 is hardened on disk. It may also be cached in memory so that Pages 6a, 6b, 6c, 6d which are accessed frequently can be located quickly. The controller must update the Directory 10 for each write command 2 it receives.

There are many possible designs for the Directory 10. In the simplest case the Directory 8 is just a linear array of Pointers 12a, 12b, 12c, 12d to the current Record 4a, 4b, 4c, 4d for each Page 6a, 6b, 6c, 6d. A null Pointer 12a, 12b, 12c, 12d indicates that the corresponding Page 6a, 6b, 6c, 6d has never been written. More complex Directories could be designed with a time dimension in order to rapidly locate the contents of each Page at previous points in time.

Figure 2:
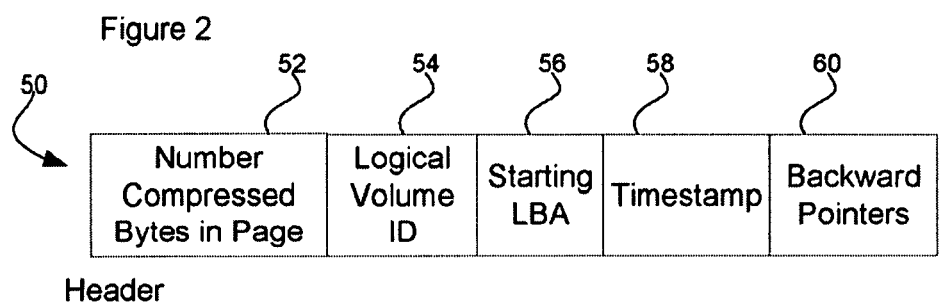
FIG. 2 shows a format of a header of a record.

With respect to FIG. 2, each Record 4a, 4b, 4c, 4d in the Journal 8 preferably contains a Header 50. The Header 50 may include the number of compressed bytes in the Page 52, an identifier for the logical volume 54, the starting LBA 56 and a Timestamp 58. Thus each record 4 is preferably self-describing and the Headers 50 can be used as a recovery mechanism to rebuild the Directory 10 by scanning the Journal 8 from the beginning. With the simple Directory 10 described above, the Header 50 may also include one or more backward Pointers 60 to Records 4a, 4b, 4c, 4d containing previous versions of the Page 6a, 6b, 6c, 6d. This allows the contents of a Page 6a, 6b, 6c, 6d to be rolled back to a previous point in time.

Initially the Journal 8 is empty and the Directory 10 contains an array of null Pointers 12a, 12b, 12c, 12d. When the controller receives a write command 2 for a single Page 6a, 6b, 6c, 6d, it appends a Record 4a, 4b, 4c, 4d to the Journal 8 and then it updates the corresponding Pointer 12a, 12b, 12c, 12d in the Directory 10. Longer writes cause the same action for each Page 6a, 6b, 6c, 6d. Unaligned or short writes are processed by reading a Page 6a, 6b, 6c, 6d, modifying one or more blocks and then writing the Page.

Reads 14 are processed by indexing down the Directory 10 to locate the corresponding Pointer 12a, 12b, 12c, 12d and then following it to a Record 4a, 4b, 4c, 4d in the Journal 8. When the data has been rolled back to a previous point in time it is necessary to follow the backward pointers 60 in each Header 50 to find the Record 4a, 4b, 4c, 4d with the correct Timestamp 58. Subsequently a new Directory could be constructed to restore full performance. This will take some time but it can be done concurrently while data access continues using the old Directory and the backward Pointers 60.

Eventually the Journal 8 will fill up and space must be freed by deleting some previous versions of the data. This is done by a background Garbage Collector which scans the Journal 8 from the beginning and deletes some previous Records 4a, 4b, 4c, 4d for each Page 6a, 6b, 6c, 6d according to a policy; in one exemplary embodiment, the policy might be "keep one version for each previous week up to a month". The Garbage Collector copies each Record 4a, 4b, 4c, 4d that is retained to the first available empty slot in the Journal 8 in order to defragment it, and it updates the Directory 10 accordingly.

Remote copy is implemented by copying each new Record 4a, 4b, 4c, 4d from the primary Journal 8 to a secondary Journal 16 at the remote site. This can be done synchronously with each write command 2 before returning completion status to the host. Alternatively, it can be an asynchronous process which may run some Records behind when the link speed cannot keep up with the I/O rate. In both cases, a secondary Directory 18 is updated to point 20a, 20b, 20c, 20d to each record 22a, 22b, 22c, 22d which is received at the remote site. In some situations the controller may switch automatically from synchronous remote copy to asynchronous remote copy and vice versa, for example if the link fails and is later repaired.

If the controller has a cache then the functions described here may be implemented in a layer above the cache. This avoids the ordering issues potentially caused by fast write and allows the usual benefits of a read cache. A Freeze/Thaw protocol can be used to ensure consistency across multiple controllers by entering sync points into each Journal.

Figure 3:
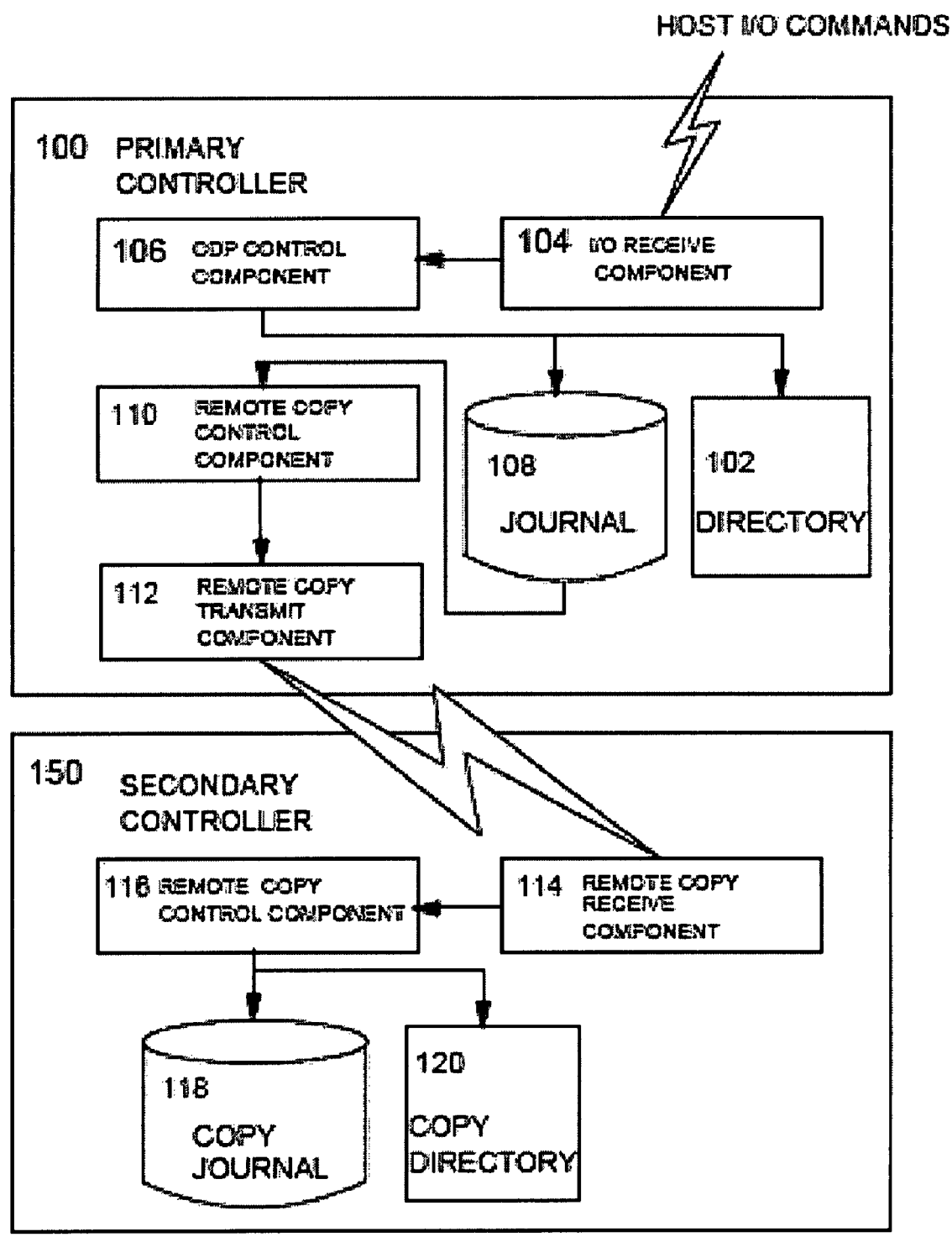
FIG. 3 shows in schematic form an arrangement of components.

With respect to FIG. 3, there is shown a storage control system in which a primary controller 100 is adapted to operate as a primary of a remote copy pair by communicating with a secondary controller 150 of the remote copy pair. Primary controller 100 and secondary controller 150 thus form the controlling components of the remote copy pair.

Primary controller 100 comprises an I/O receiving component 104 for receiving read and write commands and a continuous data protection control component 106 operatively coupled to the I/O receiving component 104 for maintaining a continuous data protection journal 108 and a directory 102.

Continuous data protection journal 108 is operable to retain the write I/O data for access by subsequent read commands and to roll back the data at the primary site. Primary controller 100 further comprises a remote copy controller component 110 adapted either to read the write I/O data from the continuous data protection journal or otherwise to receive the write I/O data—this may be by using a split write technique, for example. Primary controller 100 further comprises a remote copy transmission component 112 operatively coupled to the remote copy controller component 110 to transmit the write I/O data to the secondary 150 of the remote copy pair.

The storage control system described may be operated with a secondary 150 of the remote copy pair, wherein the secondary 150 of the remote copy pair comprises a copy continuous data protection journal 118 to maintain a single copy of each item of write I/O data for use in remote recovery. In such an arrangement, remote copy receive component 114 receives the copy of the write I/O data from the primary and passes it to remote copy control component 116, which writes the copy write I/O data to copy journal 118 and updates directory 120.

The storage control system described may further comprise a compression component to convert the write I/O data to a compressed form and a decompression component to convert the write I/O data in its compressed form to a decompressed form. The compression component may be incorporated into any of the control components at the primary or the secondary, or it may comprise an additional component either in the primary or secondary controller or incorporated into a transmission path of the write I/O data.

The described embodiments may addresses the problem of providing a technological means for maintaining local continuous data protection integrated with a remote copy facility, using commonly-available components and with minimal additional resource use.

Figure 4:
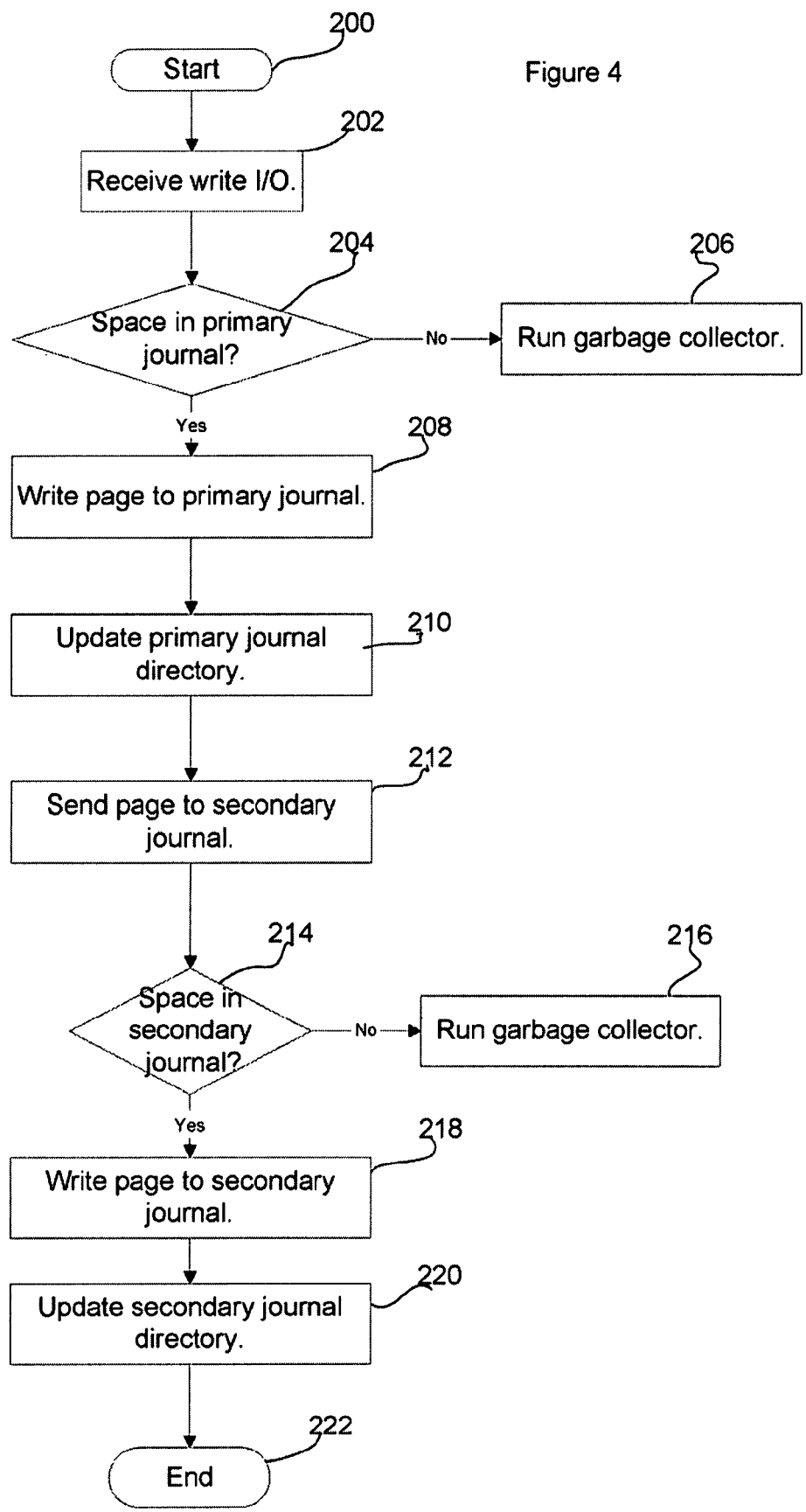
FIG. 4 shows in flowchart form one method or one logic arrangement.

With respect to FIG. 4, there is shown in flowchart for one method or logic arrangement of operations. It will be clear to one of ordinary skill in the art that many modifications and variations, including, for example, variations in the sequence of steps, may be made without departing from the scope of the embodiments.

The exemplary method begins as START step 200. The primary controller receives a write command at step 202. At step 204, a test is made to determine whether there is space available in the primary CDP journal 108 (FIG. 3). If space is lacking, or if some threshold amount of available space is not reached, a garbage collector or other means of reclaiming space may be activated at step 206. If space is available, one or more pages are written to the primary CDP journal 108 at step 208, and the primary journal directory 102 is updated accordingly at step 210. At step 212, the one or more pages are sent to the secondary journal 118. At step 214, a test is made to determine whether there is space available in the secondary journal 118. If space is lacking, or if some threshold amount of available space is not reached, a garbage collector or other means of reclaiming space may be activated at step 216. If space is available, the one or more pages are written to the secondary journal 118 at step 218, and the secondary journal directory 120 is updated accordingly at step 220. The exemplary method completes at END step 222.

Certain of the described embodiments may provide a technological means for maintaining local continuous data protection integrated with a remote copy facility, using commonly-available components and with minimal additional resource use.

All or part of the method of the described embodiments may suitably and usefully be embodied in a logic apparatus, or a plurality of logic apparatus, comprising logic elements arranged to perform the operations of the method and that such logic elements may comprise hardware components, firmware components or a combination thereof.

Further, all or part of a logic arrangement may be embodied in a logic apparatus comprising logic elements to perform the described, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Yet further, the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The described embodiments may further be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system. ROM or fixed disk, or distributed from a server or electronic bulletin board over a network, for example, the Internet or World Wide Web.

In an alternative, the described embodiments may be realized in the form of a computer implemented method of deploying a service comprising steps of deploying computer program code operable to, when deployed into a computer infrastructure and executed thereon, cause said computer system to perform all the method operations.

In a further alternative, the described embodiments may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiments without departing from the scope of the present invention.

The invention claimed is:

1. A computer readable storage medium having computer code executed by a primary controller in communication with a secondary controller to perform operations, the operations comprising:
   dividing logical volumes managed by the primary storage controller into pages;
   receiving a write request to the logical volume having modified data;
   adding a record including the page of the logical volume having the modified data for the logical volume to a primary journal, wherein the primary journal includes records having writes to the pages of the logical volumes, wherein the records are enabled to include multiple versions of modifications to pages of the logical volumes, and wherein the primary journal provides continuous data protection to retain modified data for subsequent read requests to the logical volume;
   copying records in the primary journal to a secondary journal at the secondary controller, wherein the secondary journal includes the records from the primary journal having pages of the logical volume;
   receiving a read request to data in the logical volume, wherein multiple versions of the requested data are included in the primary journal;
   determining the record including one of the versions of the requested data to return to the read request;
   accessing the determined record of the version of the requested data from the primary journal to return to the read request.

2. The computer readable storage medium of claim 1, wherein the primary journal includes information linking records for one page in the primary journal, wherein a plurality of the linked records provide different versions of data for the page, wherein the read request is with respect to a point-in-time, wherein the operations further comprise:
   processing the linked records for the page in the primary journal to determine one record for the page having a timestamp as of the point-in-time of the read request.

3. The computer readable storage medium of claim 2, wherein the operations further comprise:
   initiating a garbage collection method to remove versions of data from the primary journal;
   processing the linked records to determine the primary journal records having previous versions of data to remove; and
   deleting the determined primary journal records.

4. The computer readable storage medium of claim 2, wherein records in the primary journal each include headers, wherein the linking information comprises at least one pointer in the headers of versions of data to at least one previous version of the data in the record.

5. The computer readable storage medium of claim 4, wherein the primary journal includes previous versions of data in sequence.

6. The computer readable storage medium of claim 1, wherein each record includes data for one page and a header, wherein the header includes a number of compressed bytes in the page and a timestamp of the data in the page, and wherein the record and data in the record is stored compressed in the primary journal.

7. The computer readable storage medium of claim 1, wherein the operations further comprise:
   maintaining a directory having pointers pointing to the records;
   receiving updated data;
   including the updated data in a record included in the primary journal; and
   updating the pointer in the directory to point to the record included in the primary journal.

8. The computer readable storage medium of claim 7, wherein the directory comprises a primary directory wherein copying records to the secondary journal causes the secondary controller to copy the records to a secondary journal and update a secondary directory to point to the data written to the secondary journal.

9. A system, comprising:
   a primary controller having a primary journal;
   primary logical volumes accessible to the primary controller;
   a secondary controller in communication with the primary controller;
   a continuous data protection component executed by the primary controller to perform operations, the operations comprising:
      dividing the primary logical volumes managed by the primary storage controller into pages;
      receiving a write request to the primary logical volume having modified data;
      adding a record including the page of the primary logical volume having the modified data for the primary logical volume as records in the primary journal, wherein the primary journal includes records having writes to the pages of the logical volumes, wherein the records are enabled to include multiple versions of modifications to pages of the primary logical volumes, and wherein the primary journal provides continuous data protection to retain modified data for subsequent read requests to the logical volume;
      copying records in the primary journal to a secondary journal at the secondary controller, wherein the secondary journal includes the records from the primary journal having pages of the primary logical volume;
      receiving a read request to data in the primary logical volume, wherein multiple versions of the requested data are included in the primary journal;
      determining the record including one of the versions of the requested data to return to the read request; and accessing the determined record of the version of the requested data from the primary journal to return to the read request.

10. The system of claim 9, wherein the primary journal includes information linking records for one page in the primary journal, wherein a plurality of the linked records provide different versions of data for the page, wherein the read request is with respect to a point-in-time, wherein the operations performed by the continuous data protection component further comprise:
processing the linked records for the page in the primary journal to determine one record for the page having a timestamp as of the point-in-time of the read request.

11. The system of claim 10, wherein records in the primary journal each include headers, wherein the linking information comprises at least one pointer in the headers of versions of data to at least one previous version of the data in the record.

12. The system of claim 9, wherein the operations performed by the continuous data protection component further comprise:
maintaining a primary directory having pointers pointing to the records;
receiving updated data;
including the updated data in a record included the primary journal; and
updating the pointer in the primary directory to point to the record included in the primary journal.

13. The system of claim 12, wherein the secondary controller performs operations, the operations comprising:
writing data to a secondary journal; and
updating a secondary directory to point to the data written to the secondary journal.

14. A method, comprising:
dividing logical volumes managed by a primary storage controller into pages;
receiving a write request to the logical volume having modified data;
adding a record including the page of the logical volume having the modified data for the logical volume to a primary journal maintained by the primary controller, wherein the primary journal includes records having writes to the pages of the logical volumes, wherein the records are enabled to include multiple versions of modifications to pages of the logical volumes, and wherein the primary journal provides continuous data protection to retain modified data for subsequent read requests to the logical volume;

copying records in the primary journal to a secondary journal at a secondary controller, wherein the secondary journal includes the records from the primary journal having pages of the logical volume;
receiving, at the primary controller, a read request to data in the logical volume, wherein multiple versions of the requested data are included in the primary journal;
determining the record including one of the versions of the requested data to return to the read request;
accessing the determined record of the version of the requested data from the journal to return to the read request.

15. The method of claim 14, wherein the primary journal includes information linking records for one page in the primary journal, wherein a plurality of the linked records provide different versions of data for the page, wherein the read request is with respect to a point-in-time, further comprising:
processing the linked records for the page in the primary journal to determine one record for the page having a timestamp as of the point-in-time of the read request.

16. The method of claim 15, wherein records in the primary journal each include headers, wherein the linking information comprises at least one pointer in the headers of versions of data to at least one previous version of the data in the record.

17. The method of claim 14, further comprising:
maintaining a directory having pointers pointing to the records;
receiving updated data;
including the updated data in a record included the primary journal; and
updating the pointer in the directory to point to the record included in the primary journal.

18. The method of claim 17, wherein the directory comprises a primary directory, further comprising:
writing data, by the secondary controller to the secondary journal; and
updating the secondary directory to point to the data written to the secondary journal.

19. The computer readable storage medium of claim 7, wherein the directory initially includes an array of null pointers corresponding to the pages.

20. The system of claim 12, wherein the directory initially includes an array of null pointers corresponding to the pages.

21. The system of claim 17, wherein the directory initially includes an array of null pointers corresponding to the pages.

* * * * *